United States Patent
Bennett et al.

(10) Patent No.: US 7,578,480 B2
(45) Date of Patent: Aug. 25, 2009

(54) REEFING APPARATUS FOR CONTROLLING THE INFLATION OF A GLIDING WING PARACHUTE

(75) Inventors: Thomas W. Bennett, Lebanon, CT (US); Roy L. Fox, Jr., Belleville, WV (US)

(73) Assignees: Pioneer Aerospace Corporation, South Windsor, CT (US); The United States of America as represented by the Secretary of the Army, Washington, DC (US)

( * ) Notice: Subject to any disclaimer, the term of this patent is extended or adjusted under 35 U.S.C. 154(b) by 263 days.

(21) Appl. No.: 11/788,431

(22) Filed: Apr. 20, 2007

(65) Prior Publication Data

US 2008/0258012 A1   Oct. 23, 2008

(51) Int. Cl.
*B64D 17/62* (2006.01)
(52) U.S. Cl. ........................... 244/149; 244/147
(58) Field of Classification Search ............. 244/151 R, 244/151 A, 151 B, 152, 147, 149, 150, 137.3
See application file for complete search history.

(56) References Cited

U.S. PATENT DOCUMENTS

| | | | |
|---|---|---|---|
| 2,356,493 A | 8/1944 | Smith | |
| 2,525,798 A * | 10/1950 | Hattan | ................... 244/142 |
| 3,048,322 A | 8/1962 | Vlasic | |
| 3,245,639 A | 4/1966 | Mitchell | |
| 3,278,143 A | 10/1966 | Engel, Jr. | |
| RE26,427 E | 7/1968 | Jalbert | |
| 3,524,613 A | 8/1970 | Reuter et al. | |
| 3,525,491 A | 8/1970 | Barish | |
| 3,756,547 A | 9/1973 | Snyder et al. | |
| 3,773,284 A | 11/1973 | Matsuo et al. | |
| 3,822,844 A | 7/1974 | Sutton | |
| 3,945,592 A | 3/1976 | Sutton | |
| 4,065,079 A | 12/1977 | Winchurch | |
| 4,129,272 A | 12/1978 | Jones et al. | |
| 4,175,722 A | 11/1979 | Higgins | |
| 4,253,627 A | 3/1981 | Matsuo | |
| 4,363,458 A | 12/1982 | Jones et al. | |
| 4,399,969 A | 8/1983 | Gargano | |
| 4,440,366 A | 4/1984 | Keeler et al. | |
| 4,540,145 A | 9/1985 | Matsuo | |
| 4,664,342 A | 5/1987 | Jones | |
| 4,678,145 A | 7/1987 | Buehrer et al. | |
| 4,705,238 A | 11/1987 | Gargano | |
| 4,771,970 A | 9/1988 | Sutton | |
| 4,813,636 A | 3/1989 | Lindgren | |
| 4,846,423 A | 7/1989 | Reuter | |
| 4,863,119 A | 9/1989 | Case et al. | |

(Continued)

*Primary Examiner*—Michael R Mansen
*Assistant Examiner*—Richard R Green
(74) *Attorney, Agent, or Firm*—Sperry, Zoda & Kane

(57) ABSTRACT

A reefing apparatus for controlling inflation of a gliding wing parachute which has a generally rectangular or trapezoidal canopy with four outer corners. The reefing mechanism includes a primary reefing loop with four supplemental reefing loops movably secured thereto by loops and connected through mounting rings to the four corners of the canopy to retain it in a general cloverleaf shape during initial stages of deployment and responsive to cutting of the primary reefing loop for release thereof for allowing full deployment or deployment into another reefed stage of the gliding wing canopy. The suspension lines are divided into four groups primarily defined by the corner closest to the point of attachment between the suspension line and the canopy.

19 Claims, 2 Drawing Sheets

U.S. PATENT DOCUMENTS

| | | |
|---|---|---|
| 4,865,272 A | 9/1989 | Schwarz |
| 4,948,071 A | 8/1990 | Summers, III |
| 5,005,785 A | 4/1991 | Puskas |
| 5,102,071 A | 4/1992 | Rieleit |
| 5,201,482 A | 4/1993 | Ream |
| 5,205,517 A | 4/1993 | Reuter |
| 5,213,288 A | 5/1993 | Girdwood |
| 5,251,853 A | 10/1993 | Ogawa et al. |
| 5,474,257 A | 12/1995 | Fisher et al. |
| 5,890,678 A | 4/1999 | Butler, Jr. |
| 5,893,536 A | 4/1999 | Lee et al. |
| 6,220,547 B1 | 4/2001 | Smith et al. |
| 6,843,451 B1 | 1/2005 | Fox, Jr. |
| 6,886,785 B2 | 5/2005 | Preston |
| 6,994,295 B2 | 2/2006 | Fox, Jr. |
| 7,028,951 B1 | 4/2006 | Sadeck |
| 2006/0231684 A1* | 10/2006 | Sadeck .................. 244/149 |

* cited by examiner

REEFING APPARATUS FOR CONTROLLING THE INFLATION OF A GLIDING WING PARACHUTE

STATEMENT REGARDING FEDERALLY SPONSORED OR DEVELOPMENT

This invention was made with government support under a contract awarded by the United States Army Soldier Systems Command of Natick, Mass. and, as such, the United States of America maintains certain rights in this invention.

BACKGROUND OF THE INVENTION

1. Field of the Invention

The present invention deals with the field of reefing devices for controlling various states of deployment of a wing of a descent control device such as a parachute. More particularly the present invention pertains to such reefing devices utilized with gliding wing parachutes which are generally rectangular in shape.

2. Description of the Prior Art

A number of devices have been patented for the purpose of reefing parachutes and in particular gliding wing parachutes such as shown in U.S. Pat. No. 2,356,493 patented Aug. 22, 1944 to P. F. Smith and assigned to Pioneer Parachute Company, Inc. on a "Parachute"; and U.S. Pat. No. 2,525,798 patented Oct. 17, 1950 to M. Hattan on a "Shockless Parachute"; and U.S. Pat. No. 3,049,322 patented Aug. 14, 1962 to F. R. Vlasic and assigned to the United States of America as represented by the Secretary of the Air Force on a "Parachute Multiple Reefing System"; and U.S. Pat. No. 3,245,639 patented Apr. 12, 1966 to J. R. Mitchell and assigned to G. Q. Parachute Company Limited on a "Reefing Means For Parachutes"; and U.S. Pat. No. 3,278,143 patented Oct. 11, 1966 to H. Engel, Jr. and assigned to the United States of America as represented by the Secretary of the Air Force on a "Parachute Canopy Reefing At Panel Centerlines"; and U.S. Reissue Pat. No. Re. 26,427 patented Jul. 16, 1968 to D. C. Jalbert and assigned to Space Recovery Research Center, Inc. on a "Multi-Cell Wing Type Aerial Device"; and U.S. Pat. No. 3,524,613 patented Aug. 18, 1970 to J. D Reuter et al and assigned to Pioneer Parachute Company, Inc. on a "Flexible Gliding Wing"; and U.S. Pat. No. 3,525,491 patented Aug. 25, 1970 to D. T. Barish and assigned to Barish Associates, Inc. on a "Parachute"; and U.S. Pat. No. 3,756,547 patented Sep. 4, 1973 to S. L. Snyder et al on a "Manually Released Refining Control"; and U.S. Pat. No. 3,773,284 patented Nov. 20, 1973 to J. T. Matsuo et al and assigned to the United States of America as represented by the Secretary of the Army on a "Controllable Multi-Stage Increasing Drag Parachute"; and U.S. Pat. No. 3,822,844 patented Jul. 9, 19174 to S. J. Sutton and assigned to Jack Sutton on a "Parachute"; and U.S. Pat. No. 3,945,592 patented Mar. 23, 1976 to S. J. Sutton on an "Air Reefing System"; and U.S. Pat. No. 4,065,079 patented Dec. 27, 1977 to C. J. Winchurch and assigned to Irvin Great Britain Limited on a "Parachute Reefing Device"; and U.S. Pat. No. 4,129,272 patented Dec. 12, 11978 to A. W. Jones et al on an "Aerofoil Structure"; and U.S. Pat. No. 4,175,722 patented Nov. 27, 1979 to M. W. Higgins on a "Control System For Ram Air Gliding Parachute"; and U.S. Pat. No. 4,253,627 patented Mar. 3, 1981 to J. T. Matsuo and assigned to the United States of America as represented by the Secretary of the Navy on a "Multi-Layer Ram Air Parachute Canopy"; and U.S. Pat. No. 4,363,458 patented Dec. 14, 1982 to A. W. Jones et al on an "Airfoil Structure"; and U.S. Pat. No. 4,399,969 patented Aug. 23, 1983 to W. L. B. Gargano and assigned to Edward Strong on a "Gliding Parachute"; and U.S. Pat. No. 4,440,366 patented Apr. 3, 1984 to A. A. Keeler et al and assigned to Commonwealth of Australia on a "Parachute Control Apparatus"; and U.S. Pat. No. 4,540,145 patented Sep. 10, 1985 to J. T. Matsuo and assigned to the United States of America as represented by the Secretary of the Navy on a "Reefing System"; and U.S. Pat. No. 4,664,342 patented May 12, 1987 to D. J. Jones and assigned to the Secretary of State for Defence in Her Britannic Majesty's Government of the United Kingdom of Great Britain and Northern Ireland on "Methods Of Deploying Parachutes"; and U.S. Pat. No. 4,678,145 patented Jul. 7, 1987 to R. J. Buehrer at al and assigned to FXC Corporation on a "Removable Slider For Parachute Deployment"; and U.S. Pat. No. 4,705,238 patented Nov. 10, 1987 to W. L. B. Gargano on a "Ram Air Parachute With Multiple Pressure Centers"; and U.S. Pat. No. 4,771,970 patented Sep. 20, 1988 to S. J. Sutton on a "Pressure Flow Control Device"; and U.S. Pat. No. 4,813,636 patented to M. J. Lindgren and assigned to Lockheed Missiles & Space Company on Mar. 21, 1989 on an "Anti-Fouling Tube For An Inflation-Control Line On A Parachute"; and U.S. Pat. No. 4,846,423 patented Jul. 11, 1989 to J. D. Reuter and assigned to Pioneer Aerospace Corporation on a "Gliding Wing Parachute Apparatus With Staged Reefing Deployment Means"; and U.S. Pat. No. 4,863,119 patented to B. E. Case et al and assigned to BRS, Inc. on Sep. 5, 1989 on a "Parachute Reefing System"; and U.S. Pat. No. 4,865,272 patented Sep. 12, 1989 to R. P. Schwarz on a "High Camber Ram-Air Parachute"; and U.S. Pat. No. 4,948,071 patented Aug. 14, 1990 to C. M. Summers, III and assigned to Glide Path International, Inc. on a "Deployment System For Parachute"; and U.S. Pat. No. 5,005,785 patented Apr. 9, 1991 to E. Puskas and assigned to Para-Flite, Inc. on a "High Drag Slider Reefing System For Parachutes"; and U.S. Pat. No. 5,102,071 patented Apr. 7, 1992 to P. Rieleit on a "Vehicle, Especially Air Or Water Vehicle"; and U.S. Pat. No. 5,201,482 patented Apr. 13, 1993 to S. M. Ream on a "Ram Air Inflatable Gliding Wing"; and U.S. Pat. No. 5,205,517 patented Apr. 27, 1993 to J. D. Reuter and assigned to Pioneer Aerospace Corporation on a "Large Parachute With Means To Positively Expand And Circularize The Inlet Area To Facilitate Deployment Thereof"; and U.S. Pat. No. 5,213,288 patented May 25, 1993 to N. T. Girdwood and assigned to Parachute Industries of Southern Africa (PTY) LTD on a "Parachute Opening Shock Reducing System"; and U.S. Pat. No. 5,251,853 patented Oct. 12, 1993 to T. Ogawa et al and assigned to Falhawk Co. Ltd. and Ashimori Industry Co., Ltd. on a "Canopy For Paraglider And/Or Parachute"; and U.S. Pat. No. 5,474,257 patented Dec. 12, 1995 to J. A. Fisher et al and assigned to USBI Co. on a "Deployable Wing"; and U.S. Pat. No. 5,890,678 patented Apr. 6, 1999 to M. C. Butler, Jr. and assigned to Butler Aerospace Technologies, Inc. on a "Device To Control Inflation Characteristics Of Parachutes"; and U.S. Pat. No. 5,893,536 patented Apr. 13, 1999 to C. K. Lee et al and assigned to the United States of America as represented by the Secretary of the Army on a "Parafoil Assembly"; and U.S. Pat. No. 6,220,547 patented Apr. 24, 2001 to J. J. Smith et al and assigned to Pioneer Aerospace Corporation on a "Large Scale Parafoil Apparatus With An Energy Attenuator For Controlling Initial Deployment"; and U.S. Pat. No. 6,843,451 patented Jan. 18, 2005 to R. L. Fox, Jr. on a "Parachute Slider Reefing With Friction Induced Retardation"; and U.S. Pat. No. 6,886,785 patented May 3, 2005 to D. Preston and assigned to Atair Aerospace on a "Ram Air Parachute With Multistage Deployment"; and U.S. Pat. No. 6,994,295 patented Feb. 7, 2006 to R. L. Fox, Jr. on a "Quonset Type Parachute"; and U.S. Pat. No. 7,028,951 patented Apr. 18, 2006 to J. E. Sadeck and assigned to the United States of America as represented by the Secretary of the Army on a "Parachute Reefing System".

SUMMARY OF THE INVENTION

A reefing apparatus is disclosed in the present invention designed specifically for controlling inflation of a gliding wing parachute having a generally rectangular canopy with four outer corners and a plurality of suspension lines extending downwardly from the canopy.

The reefing apparatus includes a primary reefing loop which is generally circular in shape and is positioned beneath the gliding wing canopy and is normally on the order of approximately eight inches in diameter. A first supplemental reefing loop is included having a first forward attaching mechanism and a first aft attaching mechanism which are detachably and movably engaged with respect to the primary reefing loop to define therebetween a first suspension line reefing zone for temporarily receiving and retaining therewithin a plurality of suspension lines after release of the gliding wing parachute and prior to full deployment of the canopy. Also the first supplemental reefing loop is preferably detachably movably engaged with respect to the first outer corner of the canopy of the gliding wing parachute to facilitate defining of the first suspension line reefing zone at a position thereadjacent. In the preferred configuration the first forward attaching mechanism comprises a first forward attaching loop which receives the primary reefing loop extending therethrough to facilitate movable attachment of the first supplemental reefing loop with respect to the primary reefing loop. Also the first aft attaching device includes a first aft attaching loop preferably for receiving the primary reefing loop extending therethrough to further facilitate movable attachment of the first supplemental reefing loop with respect to the primary reefing loop.

With a similar configuration a second supplemental reefing loop is defined which includes a second forward attaching device and a second aft attaching device which are defined thereon and are each detachably and movably engaged with respect to the primary reefing loop to define therebetween a second suspension line reefing zone for temporarily receiving and retaining therewithin of a plurality of suspension lines after initial release of the gliding wing parachute and prior to full deployment of the canopy. The second supplemental reefing loop is also detachably and movably engaged with respect to the second outer corer of the canopy of the gliding wing parachute to facilitate defining of the second suspension line reefing zone at a position thereadjacent. The second forward attaching device itself preferably comprises a second forward attaching loop for receiving the primary reefing loop extending therethrough to in this manner provide movable attachment of the second supplemental reefing loop with respect to the primary reefing loop. The second aft attaching device also preferably includes a second aft attaching loop for receiving the primary reefing loop extending therethrough to further facilitate movable attachment of the second supplemental reefing loop with respect to the primary reefing loop.

A third supplemental reefing loop is provided which includes a third forward attaching mechanism and a third aft attaching mechanism defined thereon which are detachably and movably engaged with respect to the primary reefing loop to define therebetween a third suspension line reefing zone for temporarily receiving and retaining therewithin a plurality of suspension lines after initial release of the gliding wing parachute and prior to full deployment of the canopy thereof. The third supplemental reefing loop also is detachably and movably engaged with respect to the third outer corner of the canopy of the gliding wing parachute to facilitate defining of the third suspension line reefing zone at a position thereadjacent. The third forward attaching device preferably comprises a third forward attaching loop which is designed to receive the primary reefing loop extending therethrough to facilitate movable attachment of the third supplemental reefing loop with respect to the primary reefing loop. The third aft attaching device preferably includes a third aft attaching loop for receiving the primary reefing loop extending therethrough to further facilitate movable attachment of the third supplemental reefing loop with respect to the primary reefing loop. It should be appreciated that the first supplemental reefing loop and the second supplemental reefing loop as well as the third and further supplemental reefing loops are movably attached to the primary reefing loop and extend outward therefrom at approximately 90 degrees with respect to one another.

The fourth supplemental reefing loop is preferably made with a similar construction which includes a fourth forward attaching device and a fourth aft attaching device defined thereon which are detachably engaged with respect to the primary reefing loop to define therebetween a fourth suspension line reefing zone. This zone is designed for the purpose of temporarily receiving and retaining reefed therewithin a plurality of suspension lines after initial release of the gliding wing parachute and prior to full deployment of the canopy. The fourth supplemental reefing loop is also preferably detachably and movably engaged with respect to the fourth outer corner of the canopy of the gliding wing parachute to facilitate defining of a fourth suspension line reefing zone at a position thereadjacent. This fourth forward attaching device preferably includes a fourth forward attaching loop for receiving the primary reefing loop. Likewise, the fourth aft attaching device preferably includes a fourth aft attaching loop to receive the primary reefing loop.

A reefing cutter is included in a position adjacent to the primary reefing loop and is operable responsive to activation thereof to sever the primary reefing loop to release the first forward attaching mechanism and the first aft attaching mechanism therefrom for releasing the suspension lines retained within the first suspension line reefing zone. This reefing cutter will also release the second forward attaching mechanism and the second aft attaching mechanism therefrom for releasing the suspension lines retained within the second suspension line reefing zone. It also releases the third forward attaching means and the third aft attaching means as well as a fourth forward attaching means and the fourth aft attaching means for facilitating complete disengagement of this reefing means. This reefing cutter is also operable responsive to activation thereof when severing the primary reefing loop to release the four outer corners of the canopy of the gliding wing parachute from engagement therewith to facilitate full deployment thereof or into another reefed stage. In the preferred configuration the reefing cutter will include a first reefing cutter device and a second reefing cutter device wherein the second reefing cutter device is operable as a redundant cutting means to the first reefing cutter device to assure severing of the primary reefing loop responsive to activation of the reefing cutter in those situations where any type of malfunction may be experienced by the first reefing cutter device.

Four corner rings are also included defined as the first, second, third and fourth corner rings which are attached respectively with respect to the first, second, third and fourth corners of the canopy. They are preferably secured thereto by a strap means and are adapted to receive extending therethrough the respective first, second, third and fourth supplemental reefing loops to facilitate detachable engagement with the respective corners when reefed and to facilitate release thereof responsive to disreefing by severing of the primary reefing loop.

It is an object of the reefing apparatus of the present invention to control the inflation of a gliding wing parachute having a rectangular canopy with four outer corners and a plurality of suspension lines extending downwardly therefrom wherein the canopy can be maintained in a reefed position have a general cloverleaf shape prior to disreefing.

It is an object of the reefing apparatus of the present invention to control the inflation of a gliding wing parachute having a rectangular canopy with four outer corners and a plurality of suspension lines extending downwardly therefrom wherein full and effective control of the inflation of the canopy of the gliding wing parachute immediately after release can temporarily be achieved.

It is an object of the reefing apparatus of the present invention to control the inflation of a gliding wing parachute having a rectangular canopy with four outer corners and a plurality of suspension lines extending downwardly therefrom by using this reefing apparatus in conjunction with other reefing means, namely, a reefing system such as described in U.S. Pat. No. 4,846,423, to further control canopy inflation.

It is an object of the reefing apparatus of the present invention to control the inflation of a gliding wing parachute having a rectangular canopy with four outer corners and a plurality of suspension lines extending downwardly therefrom to eliminate the need for an initial parachute to stabilize and slow the descent of the payload prior to parafoil deployment.

It is an object of the reefing apparatus of the present invention to control the inflation of a gliding wing parachute having a rectangular canopy with four outer corners and a plurality of suspension lines extending downwardly therefrom to temporarily reduce significantly the gliding characteristics of wing parachutes.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
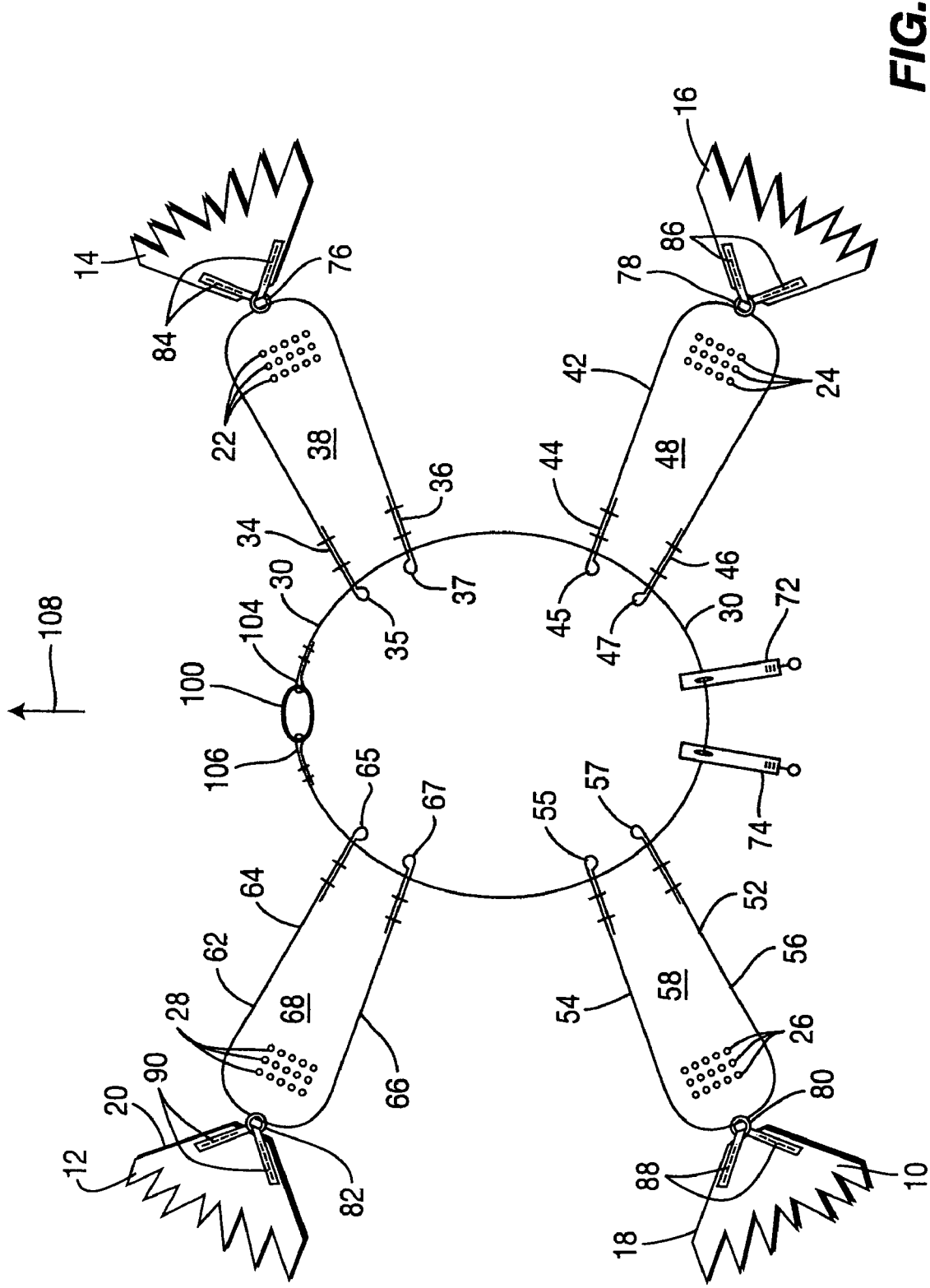
FIG. 1 is a bottom plan close-up view of the reefing apparatus of the present invention shown in the fully reefed position.

The present invention provides a reefing apparatus designed specifically for controlling the inflation of a generally rectangular canopy 12 of a gliding wing parachute 10. Such gliding wing parachutes generally have a square or rectangular configuration on slightly trapezoidal configuration and include four outer corners defined for the purposes of this invention as a first canopy corner 14, a second canopy corner 16, a third canopy corner 18 and a fourth canopy corner 20. In the preferred configuration of this invention the first canopy corner 14 comprises the left front corner 92 of canopy 12 and the second canopy corner 16 provides the left rear corner 94 of the canopy 12. Furthermore the third canopy corner 18 provides the right rear corner 96 of canopy 12 and the fourth canopy corner 20 provides the right rear corner 98 of canopy 12. The full open canopy is designed to be moving in the direction shown by forward direction arrow 108.

When the canopy 12 of any type of configuration of gliding wing parachute 10 opens it is important that the initial stages of the inflation of the canopy be controlled to prevent excessive shock and also to assure proper configuration when the canopy 12 is fully inflated or inflated in a subsequent reefed stage. The reefing apparatus of the present invention provides this construction in a simple unique novel manner.

Figure 2:
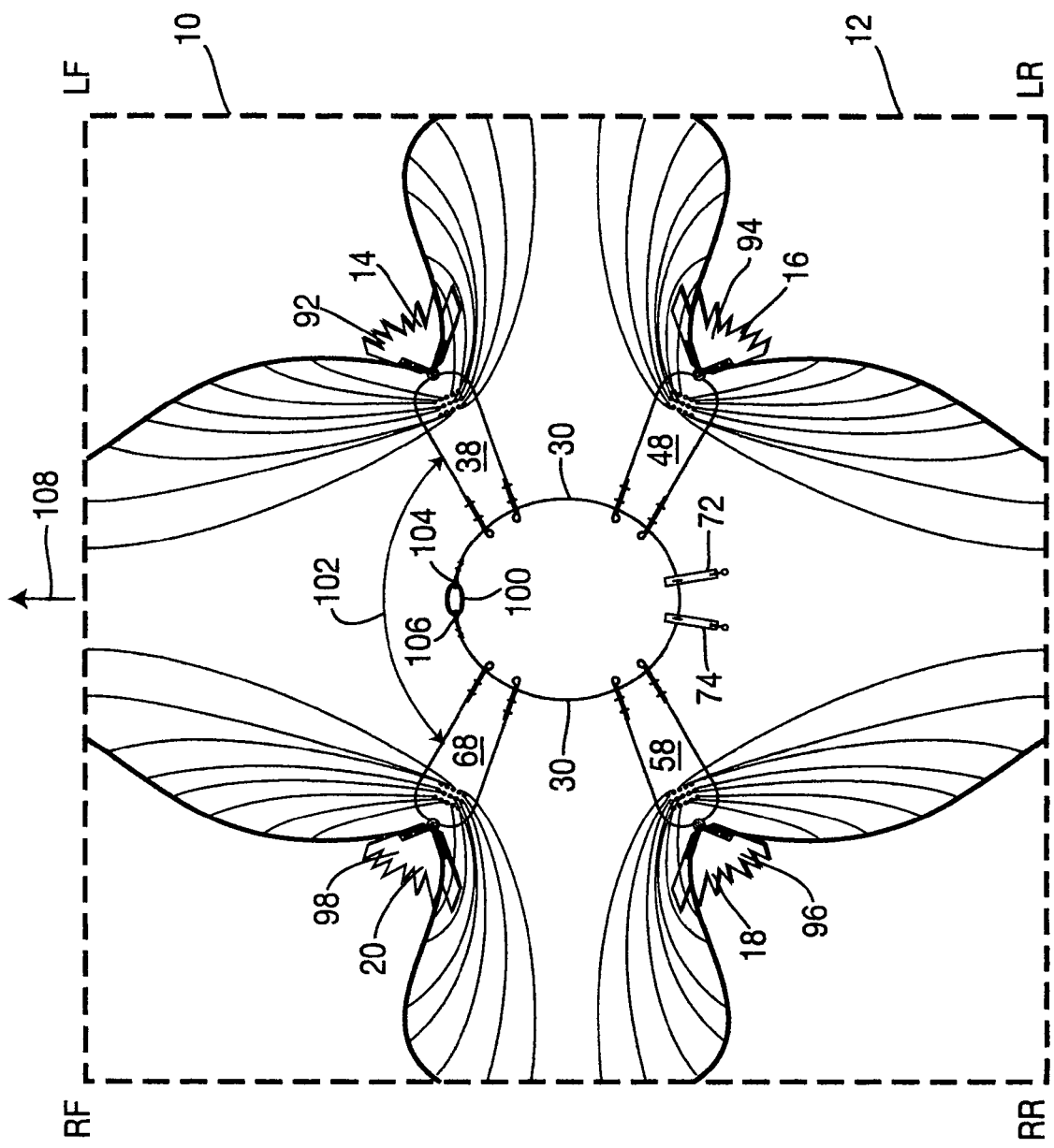
FIG. 2 is a bottom plan view of an embodiment of the reefing apparatus and gliding wing parachute showing the rectangular canopy in the reefed position in full line and in the fully deployed profile or subsequent reefing stage profile in dotted outline.

FIG. 2 shows the reefing mechanism as viewed from below as it extends around the suspension lines of the canopy 12 for reefing thereof and as it is attached to the corners 92, 94, 96 and 98 of the canopy 12. The FIG. 2 configuration shows the generally rectangular canopy 12 in the reefed position in full lining. In dotted outline the generally rectangular configuration of the canopy 12 when fully inflated or subsequent reefed stage is also shown in FIG. 2. FIG. 1 is a close-up illustration of the reefing mechanism itself showing more details and without showing the full extent of the canopy.

The present invention includes a primary reefing loop 30 which will normally extend in a generally circular shape and is commonly of a size approximately eight inches in diameter. Of course any size can be chosen by reducing the size or increasing the size of the various elements of this invention while still coming within the metes and bounds of the concept of the present invention. However, eight inches is a common diameter for this primary reefing loop 30.

A first supplemental reefing loop 32 is preferably movably mounted at two locations with respect to the primary reefing loop 30 by a first forward attaching means 34 and a first aft attaching means 36. Preferably the first forward attaching means 34 will comprise a first forward attaching loop 34 which is adapted to receive the primary reefing loop 30 extending therethrough. Similarly the first aft attaching means 36 will preferably be formed to receive the primary reefing loop 30 extending therethrough. In this manner the first supplemental reefing loop 32 is movably secured at two locations with respect to the primary reefing loop 30 in order to define therewithin a first suspension line reefing zone 38. This first suspension line reefing zone 38 is adapted to receive therein a plurality of suspension lines which are attached to the canopy. The suspension lines which are adapted to be reefed by being positioned within the first suspension line reefing zone 38 are defined as the first suspension lines 22.

In a similar configuration a second supplemental reefing loop 42 will preferably be movably attached with respect to the primary reefing loop 30 at two locations by the inclusion of a second forward attaching means 44 and a second aft attaching means 46 being defined thereon. In the preferred configuration the second forward attaching means 44 and the second aft attaching means 46 will both be designed to receive extending therethrough the primary reefing loop 30 movably. In this manner the second supplemental reefing loop 42 will be movably engaged with respect to the primary reefing loop 30 and will define therewith a second suspension line reefing zone 48 designed to retain therewithin a plurality of suspension lines which are connected to the canopy 12 which are defined as the second suspension lines 24.

With a similar construction a third supplemental reefing loop 52 will be defined which will preferably be movably secured with respect to the primary reefing loop 30 at two locations. The third supplemental reefing loop 52 will preferably include a third forward attaching means 54 and a third aft attaching means 56 both facilitating movable attachment to the primary reefing loop 30. With this configuration the third supplemental reefing loop 52 by being connected to the primary reefing loop 30 at two locations will define therebetween a third suspension line reefing zone 58 for receiving extending therethrough a plurality of third suspension lines 26.

A fourth supplemental reefing loop 62 will preferably be movably secured to the primary reefing loop 30 at two different locations by the inclusion of a forth forward attaching means 64 and a fourth aft attaching means 66. The attachment loop means 64 and 66 will be adapted to receive the primary reefing loop 30 extending therethrough in order to facilitate movable attachment of the fourth supplemental reefing loop 62 with respect to the primary reefing loop 30. With this construction the fourth supplemental reefing loop 62 in combination with the primary reefing loop 30 will define a fourth suspension line reefing zone 68 therebetween which is adapted to receive and reef a plurality of fourth suspension lines 28 extending therethrough.

As such, it can be seen that the first through fourth supplemental reefing loops 32, 42, 52 and 62 will in this manner reef the first suspension lines 22, the second suspension lines 24, the third suspension lines 26 and the fourth suspension lines 28 extending through the respective reefing zones defined thereadjacent.

It is also important to appreciate that the first supplemental reefing loop 32 will be attached to the first canopy corner 14 and the second supplemental reefing loop 42 will be preferably movably attached with respect to the second canopy corner 16 and the third supplemental reefing loop 52 will preferably be movably secured with respect to the third canopy corner 18. Finally the fourth supplemental reefing loop 62 will preferably be movably secured with respect to the fourth canopy corner 20. In this manner reefing of the canopy itself as well as reefing of the suspension lines will be provided by the configurations of the four individual reefing loops 32, 42, 52 and 62 when retained by the primary reefing loop 30.

It is preferred that the attachment between the first supplemental reefing loop 32 and the first canopy corner 14 be a movable attachment and this is achieved by the inclusion of a first corner ring 76 preferably mounted with respect to the first canopy corner 14. This first corner ring 76 will preferably be connected through a first strap 84 to the first canopy corner 14 and will allow the first supplemental reefing loop 32 to pass therethrough to facilitate reefing of the canopy 12 of the gliding wing parachute 10.

In a similar manner a second corner ring 78 will preferably be mounted about a second strap 86 with respect to the second canopy corner 16 of the canopy 12. The second corner ring 78 will be adapted to receive the second supplemental reefing loop 42 extending therethrough to facilitate movable attachment therebetween and to facilitate reefing of the second canopy corner 16 by the apparatus of the present invention.

It is also preferable that a third corner ring 80 be movable mounted to a third strap 88 which is secured to the third canopy corner 18 of the canopy 12 of the parachute 10 of the present invention in such a manner as to be adapted to receive the third supplemental reefing loop 52 extending therethrough to facilitate reefing of the third canopy corner 18. Additionally a fourth corner ring 82 will preferably be included mounted with a fourth strap 90 extending therethrough wherein the fourth strap 90 is secured with respect to the fourth canopy corner 20 to facilitate reefing thereof. The fourth corner ring 82 is adapted to receive the fourth supplemental reefing loop 62 extending therethrough to facilitate movable attachment therewith and reefing of the fourth canopy corner 20.

The reefing of the first, second, third and fourth canopy corners 14, 16, 18 and 20 by the primary reefing loop 30 and the first through fourth supplemental reefing loops 32, 42, 52, and 62 will normally orient the canopy 12 of the gliding wing parachute into overall "cloverleaf" shape because the outer corners of the rectangular profile of the canopy are retained with respect to a central loop, namely, the primary reefing loop 30. In the preferred configuration of the present invention there will be approximately a 90 degree angle between the first, second, third and fourth supplemental reefing loops 32, 42, 52 and 62 due to the general overall square or rectangular configuration of the reefing apparatus disclosed herein.

The present invention will also include a reefing cutter means 70 which is mounted at a position immediately adjacent to the primary reefing loop 30 and preferably is mounted thereon such that when activated the reefing cutter means 70 will sever the primary reefing loop 30 and in this manner release the first through fourth supplemental reefing loops 32, 42, 52 and 62. This releasing will also disreef the first, second, third and fourth suspension lines 22, 24, 26 and 28 and will also disreef the canopy 12 either fully or into another subsequent reefed stage by releasing of the reefing of the four corners 14, 16, 18 and 20. Actuation of the reefing cutter means 70 is a very important aspect of the present invention to assure full efficient dissent control and for this reason this reefing cutter 70 is preferably configured having at least two individual reefing cutters, namely, a first reefing cutter device 72 and a second reefing cutter device 74. In this manner, if for any reason the first reefing cutter device 72 fails to properly release when activated, then actuation of the second reefing cutter device 74 can be provided as a safety redundancy.

Initial assembly of the apparatus of the present invention is achieved by passing the primary reefing loop 30 through each pair of individual attachment loops associated with each of the first through fourth supplemental reefing loops 32, 42, 52 and 62. The primary reefing loop 30 then needs to be closed which is achieved by the defining of a first packing loop 104 and a second packing loop 106 thereon which can be secured together by a separate piece defined as the assembly loop 100. In the preferred configuration of this invention the assembly loop or assembly tie is formed by two turns of 6500 lb. Kevlar cord. This provides sufficient strength to withstand the forces to which the reefing apparatus of the present invention will be exposed prior to disreefing of the canopy and the suspension lines.

Orientation of the apparatus of the present invention can be seen by noting that the forward direction arrow 108 indicates the direction of movement of the fully open canopy during descent.

This apparatus provides a means for descent control to aid in the aerial delivery of heavy cargo by maintaining a stable drag producing geometry during and after reefing. This reefing configuration provides substantial deceleration of the cargo payload and establishes a benign condition for the progressive inflation of the canopy of a gliding wing parachute otherwise known as a parafoil parachute. Also this construction has been found to minimize the need for a drogue or programmer parachute in large parafoil applications. It also should be appreciated that this reefing can be used in conjunction with other types of parachute reefing to provide various stages or combined configurations of reefing such as the mid-span reefing apparatus shown in U.S. Pat. No. 4,846,423. Particularly the reefing system shown in the present invention is easily combined for usage with traditional slider reefing constructions to provide improved inflation control.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:

1. A reefing apparatus for controlling the inflation of a gliding wing parachute having a generally rectangular canopy with four outer corners and a plurality of suspension lines extending downwardly therefrom, said reefing apparatus comprising:
   A. a primary reefing loop means positioned beneath the gliding wing canopy;
   B. a first supplemental reefing loop means including a first forward attaching means and a first aft attaching means defined thereon which are each detachably engaged to said primary reefing loop means to define therebetween a first suspension line reefing zone for receiving and retaining therewithin of a plurality of suspension lines after release of the gliding wing parachute and prior to full deployment or deployment into another reefed stage of the canopy, said first supplemental reefing loop means also being detachably engaged to a first outer corner of the canopy of the gliding wing parachute to facilitate reefing of the canopy and defining of said first suspension line reefing zone at a position thereadjacent;
   C. a second supplemental reefing loop means including a second forward attaching means and a second aft attaching means defined thereon which are each detachably engaged to said primary reefing loop means to define therebetween a second suspension line reefing zone for receiving and retaining therewithin of a plurality of suspension lines after initial release of the gliding wing parachute and prior to full deployment or deployment into another reefed stage of the canopy, said second supplemental reefing loop means also being detachably engaged to a second outer corner of the canopy of the gliding wing parachute to facilitate reefing of the canopy and defining of said second suspension line reefing zone at a position thereadjacent;
   D. a third supplemental reefing loop means including a third forward attaching means and a third aft attaching means defined thereon which are each detachably engaged to said primary reefing loop means to define therebetween a third suspension line reefing zone for receiving and retaining therewithin of a plurality of suspension lines after initial release of the gliding wing parachute and prior to full deployment or deployment into another reefed stage of the canopy, said third supplemental reefing loop means also being detachably engaged to a third outer corner of the canopy of the gliding wing parachute to facilitate reefing of the canopy and defining of said third suspension line reefing zone at a position thereadjacent;
   E. a fourth supplemental reefing loop means including a fourth forward attaching means and a fourth aft attaching means defined thereon which are each detachably engaged to said primary reefing loop means to define therebetween a fourth suspension line reefing zone for receiving and retaining therewithin of a plurality of suspension lines after initial release of the gliding wing parachute and prior to full deployment or deployment into another reefed stage of the canopy, said fourth supplemental reefing loop means also being detachably engaged to a fourth outer corner of the canopy of the gliding wing parachute to facilitate reefing of the canopy and defining of said fourth suspension line reefing zone at a position thereadjacent; and
   F. a reefing cutter means positioned on to said primary reefing loop means and being operable responsive to activation thereof to sever said primary reefing loop means to release said first forward attaching means and said first aft attaching means therefrom for releasing the suspension lines retained within said first suspension line reefing zone, and to release said second forward attaching means and said second aft attaching means therefrom for releasing the suspension lines retained within said second suspension line reefing zone, and to release said third forward attaching means and said third aft attaching means therefrom for releasing the suspension lines retained within said third suspension line reefing zone, and to release said fourth forward attaching means and said fourth aft attaching means therefrom for releasing the suspension lines retained within said fourth suspension line reefing zone, said reefing cutter means also being operable responsive to activation thereof when severing said primary reefing loop means to release the four outer corners of the canopy of the gliding wing parachute from engagement therewith to facilitate full deployment or deployment into a subsequent reefed stage thereof.

2. A reefing apparatus for controlling the inflation of a gliding wing parachute having a canopy with four outer corners and a plurality of suspension lines extending downwardly therefrom as defined in claim 1 wherein said first forward attaching means, said first aft attaching means, said second forward attaching means, said second aft attaching means, said third forward attaching means, said third aft attaching means, said fourth forward attaching means and said fourth aft attaching means are all movably attached with respect to said primary reefing loop means to facilitate release therefrom responsive to severing of said primary reefing loop means.

3. A reefing apparatus for controlling the inflation of a gliding wing parachute having a canopy with four outer corners and a plurality of suspension lines extending downwardly therefrom as defined in claim 2 wherein said first forward attaching means comprises a first forward attaching loop for receiving said primary reefing loop means extending therethrough to facilitate movable attachment of said first supplemental reefing loop means with respect to said primary reefing loop means and wherein said first aft attaching means comprises a first aft attaching loop for receiving said primary reefing loop means extending therethrough to further facilitate movable attachment of said first supplemental reefing loop means with respect to said primary reefing loop means, and wherein said second forward attaching means comprises a second forward attaching loop for receiving said primary reefing loop means extending therethrough to facilitate movable attachment of said second supplemental reefing loop means with respect to said primary reefing loop means and wherein said second aft attaching means comprises a second aft attaching loop for receiving said primary reefing loop means extending therethrough to further facilitate movable attachment of said second supplemental reefing loop means with respect to said primary reefing loop means, wherein said third forward attaching means comprises a third forward attaching loop for receiving said primary reefing loop means extending therethrough to facilitate movable attachment of said third supplemental reefing loop means with respect to said primary reefing loop means and wherein said third aft attaching means comprises a third aft attaching loop for receiving said primary reefing loop means extending therethrough to further facilitate movable attachment of said third supplemental reefing loop means with respect to said primary reefing loop means, and wherein said fourth forward attaching means comprises a fourth forward attaching loop for receiving said primary reefing loop means extending therethrough to facilitate movable attachment of said fourth supplemental reefing loop means with respect to said primary reefing loop means and wherein said fourth aft attaching means comprises a fourth aft attaching loop for receiving said primary reefing loop means extending therethrough to further facilitate movable attachment of said fourth supplemental reefing loop means with respect to said primary reefing loop means.

4. A reefing apparatus for controlling the inflation of a gliding wing parachute having a canopy with four outer corners and a plurality of suspension lines extending downwardly therefrom as defined in claim 1 wherein the canopy of the gliding wing is of a generally rectangular shape and defines a first canopy corner, a second canopy corner, a third canopy corner and a fourth canopy corner and wherein said first supplemental reefing loop means is movably attached with respect to the first canopy corner, and wherein said second supplemental reefing loop means is movably secured with respect to the second corner, and wherein said third supplemental reefing loop means is movably secured with respect to the third corner, and wherein said fourth supplemental reefing loop means is movably secured with respect to the fourth corner to reef the gliding wing canopy and allow release thereof responsive to severing of said primary reefing loop means.

5. A reefing apparatus for controlling the inflation of a gliding wing parachute having a canopy with four outer corners and a plurality of suspension lines extending downwardly therefrom as defined in claim 4 wherein further comprising a first corner ring attached to the first canopy corner and a second corner ring attached to the second canopy corner and a third corner ring attached to the third canopy corner and a fourth corner ring attached to the fourth canopy corner.

6. A reefing apparatus for controlling the inflation of a gliding wing parachute having a canopy with four outer corners and a plurality of suspension lines extending downwardly therefrom as defined in claim 5 wherein said first supplemental reefing loop means is positioned extending through said first corner ring to provide movable attachment between said primary reefing loop means and the first canopy corner which will release responsive to severing of said primary reefing loop means, and wherein said second supplemental reefing loop means is positioned extending through said second corner ring to provide movable attachment between said primary reefing loop means and the second canopy corner which will release responsive to severing of said primary reefing loop means, and wherein said third supplemental reefing loop means is positioned extending through said third corner ring to provide movable attachment between said primary reefing loop means and the third canopy corner which will release responsive to severing of said primary reefing loop means, and wherein said fourth supplemental reefing loop means is positioned extending through said fourth corner ring to provide movable attachment between said primary reefing loop means and the fourth canopy corner which will release responsive to severing of said primary reefing loop means.

7. A reefing apparatus for controlling the inflation of a gliding wing parachute having a canopy with four outer corners and a plurality of suspension lines extending downwardly therefrom as defined in claim 4 wherein the suspension lines extending through said first suspension line reefing zone comprise those suspension lines attached to the left forward quarter of the canopy and wherein the suspension lines extending through said second suspension line reefing zone comprise those suspension lines attached to the left aft quarter of the canopy and wherein the suspension lines extending through said third suspension line reefing zone comprise those suspension lines attached to the right aft quarter of the canopy and wherein the suspension lines extending through said fourth suspension line reefing zone comprise those suspension lines attached to the right forward quarter of the canopy.

8. A reefing apparatus for controlling the inflation of a gliding wing parachute having a canopy with four outer corners and a plurality of suspension lines extending downwardly therefrom as defined in claim 5 further including a first strap secured to the parachute canopy and extending through said first corner ring for retaining thereof the first canopy corner, and a second strap secured to the parachute canopy and extending through said second corner ring for retaining thereof the second canopy corner, and a third strap secured to the parachute canopy and extending through said third corner ring for retaining thereof the third canopy corner, and a fourth strap secured to the parachute canopy and extending through said fourth corner ring for retaining thereof the fourth canopy corner.

9. A reefing apparatus for controlling the inflation of a gliding wing parachute having a canopy with four outer corners and a plurality of suspension lines extending downwardly therefrom as defined in claim 4 wherein the first canopy corner comprises the left front corner of the generally rectangular gliding wing parachute canopy and wherein the second canopy corner comprises the left rear corner of the generally rectangular gliding wing parachute canopy and wherein the third canopy corner comprises the right rear corner of the generally rectangular gliding wing parachute canopy and wherein the fourth canopy corner comprises the right front corner of the generally rectangular gliding wing parachute canopy.

10. A reefing apparatus for controlling the inflation of a gliding wing parachute having a canopy with four outer corners and a plurality of suspension lines extending downwardly therefrom as defined in claim 1 wherein said reefing cutter means comprises:

A. a first reefing cutter device attached on said primary reefing loop means; and B. a second reef cutter device also attached on said primary reefing loop means and operable as a redundant cutting means to said first reefing cutter device to assure severing of said primary reefing loop means responsive to activation of said reefing cutter means.

11. A reefing apparatus for controlling the inflation of a gliding wing parachute having a canopy with four outer corners and a plurality of suspension lines extending downwardly therefrom as defined in claim 1 wherein said primary reefing loop means includes an assembly loop means to facilitate initial assembly of said reefing apparatus.

12. A reefing apparatus for controlling the inflation of a gliding wing parachute having a canopy with four outer corners and a plurality of suspension lines extending downwardly therefrom as defined in claim 1 wherein said primary reefing loop means is generally circular.

13. A reefing apparatus for controlling the inflation of a gliding wing parachute having a canopy with four outer corners and a plurality of suspension lines extending downwardly therefrom as defined in claim 12 wherein said primary reefing loop means has a diameter of approximately eight inches.

14. A reefing apparatus for controlling the inflation of a gliding wing parachute having a canopy with four outer corners and a plurality of suspension lines extending downwardly therefrom as defined in claim 1 wherein said primary reefing loop means is generally circular when reefed and wherein said first supplemental reefing loop means and said second supplemental loop means and said third supplemental reefing loop means and said fourth supplemental loop means are oriented at approximately ninety (90) degrees with respect to one another.

15. A reefing apparatus for controlling the inflation of a gliding wing parachute having a canopy with four outer corners and a plurality of suspension lines extending downwardly therefrom as defined in claim 1 wherein said primary reefing loop means is made of a Kevlar web material.

16. A reefing apparatus for controlling the inflation of a gliding wing parachute having a canopy with four outer corners and a plurality of suspension lines extending downwardly therefrom as defined in claim 11 wherein said assembly loop means is made of a Kevlar cord material.

17. A reefing apparatus for controlling the inflation of a gliding wing parachute having a canopy with four outer corners and a plurality of suspension lines extending downwardly therefrom as defined in claim 11 wherein said primary reefing loop means includes a first packing loop means and a second packing loop means and wherein said assembly loop means is adapted to extend therethrough for facilitating securement therebetween during initial assembly of said primary reefing loop means.

18. A reefing apparatus for controlling the inflation of a gliding wing parachute having a canopy with four outer corners, namely a first canopy corner, a second canopy corner, a third canopy corner and a fourth canopy corner, and a plurality of suspension lines extending downwardly therefrom, said reefing apparatus comprising:

A. a primary reefing loop means being generally circular in shape and positioned beneath the gliding wing canopy;

B. a first supplemental reefing loop means including a first forward attaching means and a first aft attaching means defined thereon which are each detachable to and movably engaged with respect to said primary reefing loop means to define therebetween a first suspension line reefing zone for temporarily receiving and retaining therewithin of a plurality of suspension lines after release of the gliding wing parachute and prior to full deployment of the canopy, said first supplemental reefing loop means also being detachable to and movably engaged with respect to a first outer corner of the canopy of the gliding wing parachute to facilitate defining of said first suspension line reefing zone at a position thereadjacent, said first forward attaching means comprising a first forward attaching loop for receiving said primary reefing loop means extending therethrough to facilitate movable attachment of said first supplemental reefing loop means with respect to said primary reefing loop means and said first aft attaching means comprising a first aft attaching loop for receiving said primary reefing loop means extending therethrough to further facilitate movable attachment of said first supplemental reefing loop means with respect to said primary reefing loop means;

C. a second supplemental reefing loop means including a second forward attaching means and a second aft attaching means defined thereon which are each detachable to and movably engaged with respect to said primary reefing loop means to define therebetween a second suspension line reefing zone for temporarily receiving and retaining therewithin of a plurality of suspension lines after initial release of the gliding wing parachute and prior to full deployment of the canopy, said second supplemental reefing loop means also being detachable to and movably engaged with respect to a second outer corner of the canopy of the gliding wing parachute to facilitate defining of said second suspension line reefing zone at a position thereadjacent, said second forward attaching means comprising a second forward attaching loop for receiving said primary reefing loop means extending therethrough to facilitate movable attachment of said second supplemental reefing loop means with respect to said primary reefing loop means and said second aft attaching means comprising a second aft attaching loop for receiving said primary reefing loop means extending therethrough to further facilitate movable attachment of said second supplemental reefing loop means with respect to said primary reefing loop means;

D. a third supplemental reefing loop means including a third forward attaching means and a third aft attaching means defined thereon which are each detachable to and movably engaged respect to said primary reefing loop means to define therebetween a third suspension line reefing zone for temporarily receiving and retaining therewithin of a plurality of suspension lines after initial release of the gliding wing parachute and prior to full deployment of the canopy, said third supplemental reefing loop means also being detachable to and movably engaged with respect to a third outer corner of the canopy of the gliding wing parachute to facilitate defining of said third suspension line reefing zone at a position thereadjacent, said third forward attaching means comprising a third forward attaching loop for receiving said primary reefing loop means extending therethrough to facilitate movable attachment of said third supplemental reefing loop means with respect to said primary reefing loop means and said third aft attaching means comprising a third aft attaching loop for receiving said primary reefing loop means extending therethrough to further facilitate movable attachment of said third supplemental reefing loop means with respect to said primary reefing loop means;

E. a fourth supplemental reefing loop means including a fourth forward attaching means and a fourth aft attaching means defined thereon which are each detachably engaged to said primary reefing loop means to define therebetween a fourth suspension line reefing zone for temporarily receiving and retaining therewithin of a plurality of suspension lines after initial release of the gliding wing parachute and prior to full deployment of the canopy, said fourth supplemental reefing loop means also being detachable to and movably engaged with respect to a fourth outer corner of the canopy of the gliding wing parachute to facilitate defining of said fourth suspension line reefing zone at a position thereadjacent, said fourth forward attaching means comprising a fourth forward attaching loop for receiving said primary reefing loop means extending therethrough to facilitate movable attachment of said fourth supplemental reefing loop means with respect to said primary reefing loop means and said fourth aft attaching means comprising a fourth aft attaching loop for receiving said primary reefing loop means extending therethrough to further facilitate movable attachment of said fourth supplemental reefing loop means with respect to said primary reefing loop means; and F. a reefing cutter means positioned on to said primary reefing loop means and being operable responsive to activation thereof to sever said primary reefing loop means to release said first forward attaching means and said first aft attaching means therefrom for releasing the suspension lines retained within said first suspension line reefing zone, and to release said second forward attaching means and said second aft attaching means therefrom for releasing the suspension lines retained within said second suspension line reefing zone, and to release said third forward attaching means and said third aft attaching means therefrom for releasing the suspension lines retained within said third suspension line reefing zone, and to release said fourth forward attaching means and said fourth aft attaching means therefrom for releasing the suspension lines retained within said fourth suspension line reefing zone, said reefing cutter means also being operable responsive to activation thereof when severing said primary reefing loop means to release the four outer corners of the canopy of the gliding wing parachute from engagement therewith to facilitate full deployment or deployment into subsequent reefed stages thereof.

19. A reefing apparatus for controlling the inflation of a gliding wing parachute having a canopy with four outer corners, namely a first canopy corner, a second canopy corner, a third canopy corner and a fourth canopy corner, and a plurality of suspension lines extending downwardly therefrom, said reefing apparatus comprising:

A. a primary reefing loop means being generally circular in shape and positioned beneath the gliding wing canopy;

B. a first supplemental reefing loop means including a first forward attaching means and a first aft attaching means defined thereon which are each detachable to and movably engaged with respect to said primary reefing loop means to define therebetween a first suspension line reefing zone for temporarily receiving and retaining therewithin of a plurality of suspension lines after release of the gliding wing parachute and prior to full deployment of the canopy, said first supplemental reefing loop means also being detachable to and movably engaged with respect to a first outer corner of the canopy of the gliding wing parachute to facilitate defining of said first suspension line reefing zone at a position thereadjacent, said first forward attaching means comprising a first forward attaching loop for receiving said primary reefing loop means extending therethrough to facilitate movable attachment of said first supplemental reefing loop means with respect to said primary reefing loop means and said first aft attaching means comprising a first aft attaching loop for receiving said primary reefing loop means extending therethrough to further facilitate movable attachment of said first supplemental reefing loop means with respect to said primary reefing loop means;

C. a second supplemental reefing loop means including a second forward attaching means and a second aft attaching means defined thereon which are each detachable to and movably engaged with respect to said primary reefing loop means to define therebetween a second suspension line reefing zone for temporarily receiving and retaining therewithin of a plurality of suspension lines after initial release of the gliding wing parachute and prior to full deployment of the canopy, said second supplemental reefing loop means also being detachable to and movably engaged with respect to a second outer corner of the canopy of the gliding wing parachute to facilitate defining of said second suspension line reefing zone at a position thereadjacent, said second forward attaching means comprising a second forward attaching loop for receiving said primary reefing loop means extending therethrough to facilitate movable attachment of said second supplemental reefing loop means with respect to said primary reefing loop means and said second aft attaching means comprising a second aft attaching loop for receiving said primary reefing loop means extending therethrough to further facilitate movable attachment of said second supplemental reefing loop means with respect to said primary reefing loop means;

D. a third supplemental reefing loop means including a third forward attaching means and a third aft attaching means defined thereon which are each detachable to and movably engaged with respect to said primary reefing loop means to define therebetween a third suspension line reefing zone for temporarily receiving and retaining therewithin of a plurality of suspension lines after initial release of the gliding wing parachute and prior to full deployment of the canopy, said third supplemental reefing loop means also being detachable to and movably engaged with respect to a third outer corner of the canopy of the gliding wing parachute to facilitate defining of said third suspension line reefing zone at a position thereadjacent, said third forward attaching means comprising a third forward attaching loop for receiving said primary reefing loop means extending therethrough to facilitate movable attachment of said third supplemental reefing loop means with respect to said primary reefing loop means and said third aft attaching means comprising a third aft attaching loop for receiving said primary reefing loop means extending therethrough to further facilitate movable attachment of said third supplemental reefing loop means with respect to said primary reefing loop means;

E. a fourth supplemental reefing loop means including a fourth forward attaching means and a fourth aft attaching means defined thereon which are each detachably engaged to said primary reefing loop means to define therebetween a fourth suspension line reefing zone for temporarily receiving and retaining therewithin of a plurality of suspension lines after initial release of the gliding wing parachute and prior to full deployment of the canopy, said fourth supplemental reefing loop means also being detachable to and movably engaged with respect to a fourth outer corner of the canopy of the gliding wing parachute to facilitate defining of said fourth suspension line reefing zone at a position thereadjacent, said fourth forward attaching means comprising a fourth forward attaching loop for receiving said primary reefing loop means extending therethrough to facilitate movable attachment of said fourth supplemental reefing loop means with respect to said primary reefing loop means and said fourth aft attaching means comprising a fourth aft attaching loop for receiving said primary reefing loop means extending therethrough to further facilitate movable attachment of said fourth supplemental reefing loop means with respect to said primary reefing loop means, said first supplemental reefing loop means and said second supplemental loop means and said third supplemental reefing loop means and said fourth supplemental loop means being movably attached to said primary reefing loop means extending outwardly therefrom at approximately ninety (90) degrees with respect to one another;

F. a reefing cutter means positioned on to said primary reefing loop means and being operable responsive to activation thereof to sever said primary reefing loop means to release said first forward attaching means and said first aft attaching means therefrom for releasing the suspension lines retained within said first suspension line reefing zone, and to release said second forward attaching means and said second aft attaching means therefrom for releasing the suspension lines retained within said second suspension line reefing zone, and to release said third forward attaching means and said third aft attaching means therefrom for releasing the suspension lines retained within said third suspension line reefing zone, and to release said fourth forward attaching means and said fourth aft attaching means therefrom for releasing the suspension lines retained within said fourth suspension line reefing zone, said reefing cutter means also being operable responsive to activation thereof when severing said primary reefing loop means to release the four outer corners of the canopy of the gliding wing parachute from engagement therewith to facilitate full deployment thereof, said reefing cutter means further comprising:

(1) a first reefing cutter device attached on said primary reefing loop means; and (2) a second reef cutter device also attached on said primary reefing loop means and operable as a redundant cutting means to said first reefing cutter device to assure severing of said primary reefing loop means responsive to activation of said reefing cutter means;

G. a first corner ring attached to the first canopy corner, said first supplemental reefing loop means being positioned extending through said first corner ring to provide movable attachment between said primary reefing loop means and the first canopy corner which will release responsive to severing of said primary reefing loop means;

H. a second corner ring attached to the second canopy corner, said second supplemental reefing loop means being positioned extending through said second corner ring to provide movable attachment between said primary reefing loop means and the second canopy corner which will release responsive to severing of said primary reefing loop means;

I. a third corner ring attached to the third canopy corner, said third supplemental reefing loop means being positioned extending through said third corner ring to provide movable attachment between said primary reefing loop means and the third canopy corner which will release responsive to severing of said primary reefing loop means; and J. a fourth corner ring attached to the fourth canopy corner, said fourth supplemental reefing loop means being positioned extending through said fourth corner ring to provide movable attachment between said primary reefing loop means and the fourth canopy corner which will release responsive to severing of said primary reefing loop means.

* * * * *